United States Patent [19]

Bauer et al.

[11] Patent Number: 4,946,143
[45] Date of Patent: Aug. 7, 1990

[54] GAS SPRING

[75] Inventors: Hans J. Bauer; Hans-Peter Bauer, both of Altdorf, Fed. Rep. of Germany; Mario Antoniani, Collegno, Italy

[73] Assignee: Fritz Bauer & Sohne oHG, Altdorf, Fed. Rep. of Germany

[21] Appl. No.: 347,296

[22] Filed: May 4, 1989

[30] Foreign Application Priority Data

May 26, 1988 [DE] Fed. Rep. of Germany ....... 3817776

[51] Int. Cl.$^5$ .............................................. F16F 9/02
[52] U.S. Cl. ............................ 267/64.11; 92/165 R; 188/322.17; 267/120
[58] Field of Search .......... 267/64.11–64.28, 267/120, 124, 129, 113; 188/322.17, 322.16, 311, 317, 289; 277/28, 34, 152, 212, 70, 27, 3, 209; 92/168, 165 R

[56] References Cited

U.S. PATENT DOCUMENTS

| 2,992,864 | 7/1961 | DeCarbon | 267/64.13 X |
| 3,134,460 | 5/1964 | DeCarbon | 267/64.11 X |
| 3,682,461 | 8/1972 | Wachenheim | 188/322.17 X |
| 4,044,866 | 8/1977 | Ishida | 188/322.17 X |
| 4,045,008 | 8/1977 | Bauer . | |
| 4,166,612 | 9/1979 | Freitag et al. . | |
| 4,323,224 | 4/1982 | Freitag et al. . | |
| 4,582,303 | 4/1986 | Taylor | 267/64.13 |
| 4,736,824 | 4/1988 | Dony et al. . | |
| 4,779,845 | 10/1988 | Bartesch et al. . | |

FOREIGN PATENT DOCUMENTS

| 0291469 | 11/1988 | European Pat. Off. ......... 267/64.11 |
| 944297 | 6/1956 | Fed. Rep. of Germany . |
| 1275367 | 8/1968 | Fed. Rep. of Germany . |
| 1943086 | 3/1971 | Fed. Rep. of Germany . |
| 2516478 | 4/1978 | Fed. Rep. of Germany . |
| 2619176 | 10/1982 | Fed. Rep. of Germany . |
| 3151070 | 8/1983 | Fed. Rep. of Germany . |
| 3617726 | 12/1986 | Fed. Rep. of Germany . |
| 88/08090 | 10/1988 | World Int. Prop. O. ...... 188/322.17 |

Primary Examiner—Douglas C. Butler
Attorney, Agent, or Firm—Browdy and Neimark

[57] ABSTRACT

A gas spring has a cylindrical housing and a piston rod mounted coaxially within it and sealingly extended out of same. The piston rod has a tapering cooperating with a seal in its pushed-in position. The seal is designed to be radially resilient and has an axially-operating radially resilient supporting ring which has webs extending parallel with the axis elastically movable radially to the axis, against which the seal applies. The purpose of this design lies in reducing the thrust force of the gas spring when the piston rod is pushed in, which should result at the same time in a reliable sealing in all operational positions.

27 Claims, 1 Drawing Sheet

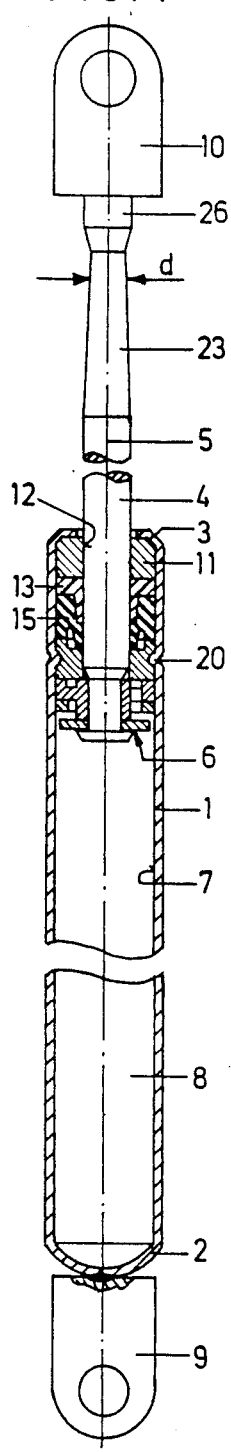
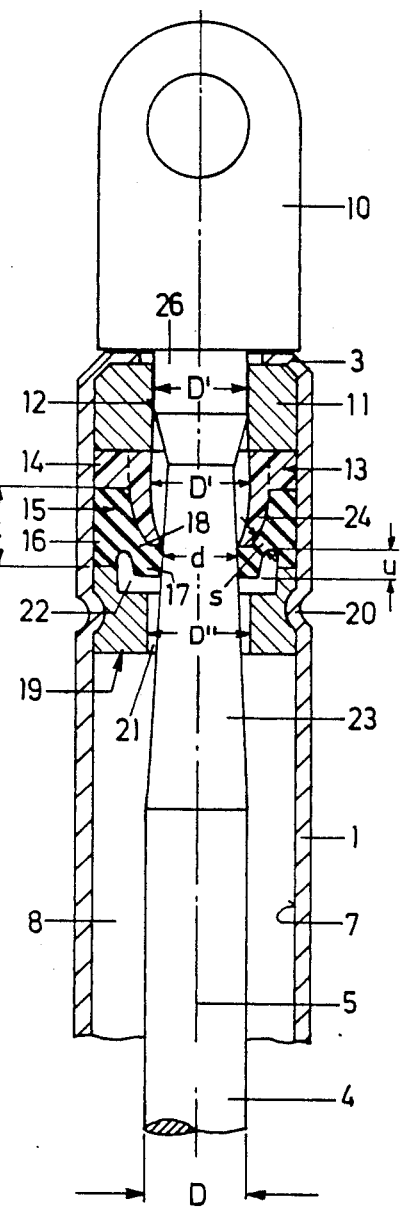
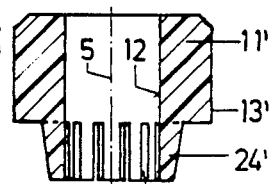
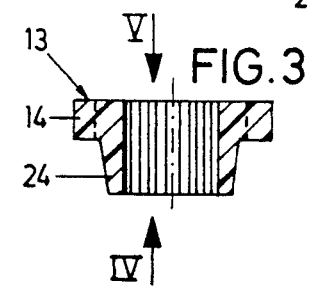
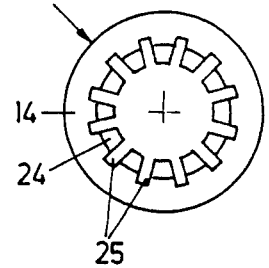
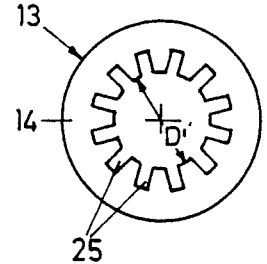

GAS SPRING

FIELD OF THE INVENTION

The invention relates to a gas spring with a tubular housing closed at one end and having an inner space filled with compressed gas and a piston rod brought out of another end of the housing which piston rod is provided at an end situated in the housing with a piston for lateral support relative to an inner wall of the housing, which rod, at the other end of the housing, is guided in a guide bush and, in the direction of a central longitudinal axis, can be moved between a position substantially pushed into the housing and a position substantially extended out of the housing, against which a seal made of an elastic sealing material rests sealingly.

BACKGROUND OF THE INVENTION

Such gas springs are also used, inter alia as lifting axiliaries for rear flaps of cars. Precisely in the case of relatively small cars the lifting force of one gas spring only is sufficient to lift the rear flap; however, the problem arises here that precisely because of the light construction of small private cars and of the presence of only one gas spring the rear flap becomes distorted. Therefore, numerous attempts have already been made at relieving the pressure on the rear flap in the closed state. The solutions found were unsatisfactory, functionally and/or because of the necessary expenditure.

SUMMARY OF THE INVENTION

It is accordingly the object of the present invention to design a gas spring of the generic type in such a manner that in the pushed-in state it has a reduced thrust force.

This object is achieved according to the invention by the piston having a tapering which, in its pushed-in position, cooperates with the seal and by the seal being designed radially resilient and being provided with an axially acting radially resilient supporting ring. As a result of the tapering the effective cross-section of the piston rod upon which the gas pressure acts is reduced, i.e. the thrust force acting onto the piston rod in its pushed-in position is reduced. If, for example, the diameter of the piston rod is reduced from 8 mm to 6 mm this means almost halving the thrust forces still acting in the pushed-in state as compared with the thrust forces acting when the piston rod is not pushed in. In spite of the tapering it is ensured that also on the cooperation of the seal with the tapering an absolutely reliable seal is ensured. The supporting ring supports the seal particularly in the axial direction, but also in radial direction. When the seal is impinged on its side facing the inner space by the compressed gas, and on its side facing away from the inner space by atmospheric pressure, it is ensured that the seal is always pressed against the piston rod, and thus cannot be lifted away from it.

When the seal has an inner ring resting against the piston rod and a membrane-like intermediate ring surrounding the inner ring, it is ensured that the seal in its inner region adjacent to the piston rod can also participate in the relatively great alterations of diameter from the normal piston rod cross-section to the tapering.

When the supporting ring is mounted on the side of the seal facing away from the inner space, it is ensured that the supporting ring imparts to the seal an axial support directed against the gas pressure.

A design according to which the supporting ring has an annular base element on which webs are formed which extend substantially parallel to the axis and which are elastically movable radially towards the axis makes it possible that also the supporting ring can participate in the radial movements of the seal on the transition from the tapering to the normal piston rod diameter and vice-versa and in so doing performs its supporting role to the full.

A design according to which the seal rests axially against the webs brings about that also the supporting ring exerts of itself a certain constriction effect onto the seal on the entry of the tapering into the seal.

Further advantages and features of the invention will become apparent from the ensuing description of an examplary embodiment, taken in conjunction with the drawings.

BRIEF DESCRIPTION OF THE DRAWINGS

FIG. 1 is an axial longitudinal section of a gas spring according to the invention, the piston rod being in its extended position;

FIG. 2 is an axial longitudinal section of a part of the gas spring, the piston rod being in its drawn-in position;

FIG. 3 is a cross-section through a supporting ring;

FIG. 4 is a top view of the supporting ring along arrow IV in FIG. 3;

FIG. 5 is a top view of the supporting ring along arrow V in FIG. 3; and

FIG. 6 is a modified form of a supporting ring.

DESCRIPTION OF THE PREFERRED EMBODIMENT

The gas spring represented in the drawing has a substantially cylindrical housing 1 made from a tube which is closed at one end 2. At the other end 3 of the housing 1 a cylindrical piston rod 4 is drawn out, arranged coaxially with the central longitudinal axis 5 of the housing 1. The piston rod 4 has at its end situated in the housing 1 a piston 6 which is constructed in the usual manner as a guide and damping piston, in connection with which details of design are not required here. This piston 6 bears—at least on one part of its outer circumference—against the inner wall 7 of the housing 1. The inner space 8 of the housing 1 is filled with compressed gas and, possibly, a small amount of oil. At the closed end 2 of the housing there is mounted a fixing device 9 in the form of a so-called eye. At the outer free end of the piston rod 4 a fixing device 10 which may be similarly constructed is also mounted.

The piston rod 4 is designed cylindrical over the greater part of its length and, there, has a diameter D. It is guided at the end 3 of the housing 1 in a guide bush 11, the hole 12 of which which extends coaxially with the axis 5 and takes up the piston rod 4 has a diameter D' which corresponds substantially to the diameter D, so that the piston rod 4 is generally radially guided without play over its substantial length in which it has a diameter D.

On the side of the guide bush 11 facing the inner space 8 there lies on the bushing a supporting ring 13 with an annular base element 14. Again, against said supporting ring 13, there is situated on the side facing the inner space 8 a seal 15 which may be firmly connected with the supporting ring 13. This seal 15, made of one piece in elastically resilient sealing material, e.g. rubber or a suitable plastic, has an outer ring 16 which applies seal-tightly on the inner wall 7, and an inner ring 17 which applies seal-tightly against the piston rod 4. The outer ring 16 and the inner ring 17 are joined together by means of an intermediate ring 18 tapering in the form of a truncated cone towards the inner space 8, the ring 18 being designed as a membrane and its thickness s in the axial direction being clearly smaller than the axial extension of the sealing region t of the outer ring or the sealing region u of the inner ring 17. On its side facing the inner space 8 the outer ring 16 applies against a supporting disc 19 which is securely held in the axial direction in the housing 1 by a bead 20. The bore 21 of this supporting disc 19 has a diameter D" which is substantially greater than the diameter D of the piston rod, so that a space 22 connecting directly with the intermediate ring 18 and the inner ring 17 of the seal 15 is impinged constantly with the gas pressure out of the inner space 8 and thus presses the inner ring 17 against the piston rod 4.

The piston rod 4 has in the region of its outer free end a tapering 23 which constricts outwardly in the form of a truncated cone. This tapering, in the pushed-in position of the piston rod 4 shown in FIG. 2, overlays the seal 15 and in fact particularly the inner ring 17 of the seal 15. The piston rod 4 has in the region of the tapering 23 a diameter d which is some 20 to 30% smaller than diameter D. There has been selected as the range of diameter d the range of the tapering 23 on which the inner ring 17 of the seal 15 applies when the piston rod 4 is fully drawn in, as shown in FIG. 2. The supporting ring 13 has webs 24 extending in the direction towards the inner space 8, and thus substantially parallel with the axis 5, between which grooves 25 are respectively formed. The grooves 25 extend, particularly for manufacturing reasons through the annular base element 14 of the supporting ring 13. The webs 24 taper towards their free end and thus apply against the inner ring 17 of the seal 15 on its side facing away from the inner space 8. By this means they support this inner ring 15 in the axial direction against displacements due to gas pressure exerted towards the end 3. If the webs 24 have in the undeformed state already the shape illustrated in FIG. 2 in which they protrude radially inwardly towards their free ends then they also exert additionally radially constricting forces on the inner ring 17.

The inner diameter D' of the annular base element 14 corresponds to the diameter D' of the bore 12 of the guide bush 11, so that the supporting ring 13, at least in the region of its base element 14 also guides the piston rod in the region of its great diameter D. The diameter D' is greater than the diameter D of the piston rod 4 only by the usual guide play of a few hundredths to a maximum of a few tenths of a millimeter.

The supporting 13 applying with its annular base element 14 and the webs 24 on the metal piston rod 4 consists appropriately in a plastic with good sliding qualities towards metal, such as, e.g. PTFE or a suitable polyamide. The supporting ring 13, however, may also be made of brass or bronze with the corresponding good sliding properties towards the harder metal (chromium-plated steel) of the piston rod 4.

The piston rod 4 has in the vicinity of the outer fixing device 10 a cylindrical portion 26 with diameter D, and therefore a non-tapered portion which, in the fully retracted position of the piston rod 4 according to FIG. 2 enters into the bore 12 of the guide bush 11, so that in this position radial movements of the piston rod relative to the housing 1 are ruled out.

In the modified embodiment according to FIG. 6 the guide bush 11' is constructed integral with the supporting ring 13', i.e. between the guide bush 11 and a base element present according to the example of embodiment described above there is no longer any difference. The guide bush 11' operates simultaneously as a base element. The webs 24' connect downwardly onto the guide bush 11' with grooves 25' arranged between them, as has already been described above. The bore 12 of the guide bush 11' is identical with the bore 12 of the guide bush 11 described above. As may be seen from FIG. 6, in this embodiment the grooves 25' do not extend as far as into the guide bush 11', so that the bore 12 has a smooth cylindrical surface.

What is claimed is:

1. A gas spring with a tubular housing (1) closed at one end (2) and having an inner space (8) filled with compressed gas and a piston rod (4) brought out of another end (3) of the housing (1) which piston rod is provided at an end situated in the housing (1) with a piston (6) for lateral support relative to an inner wall (7) of the housing (1), which rod, at the other end of the housing (1) is guided in a guide bush (11, 11') and, in the direction of a central longitudinal axis (5), can be moved between a position substantially pushed into the housing (1) and a position substantially extended out of the housing (1), against which a seal (15) made of an elastic sealing material rests sealingly, wherein the piston rod (4) has a tapering (23) which, in the pushed-in position of the piston rod (4), cooperates with the seal (15) wherein the seal (15) is designed radially resilient supporting ring (13, 13'), and, wherein said seal (15) prevents gas passage between said seal (15) and said piston rod (4) at all positions of said piston rod (4).

2. A gas spring according to claim 1, wherein the seal (15) is impinged on its side facing the inner space (8) by the compressed gas, and on its side facing away from the inner space (8) by atmospheric pressure.

3. A gas spring according to claim 2, wherein the supporting ring (13, 13') is mounted on the side of the seal (15) facing away from the inner space (8).

4. A gas spring according to claim 1, wherein the seal (15) has an inner ring (17) resting against the piston rod (4) and a membrane-like intermediate ring (18) surrounding the inner ring (17).

5. A gas spring according to claim 4, wherein the intermediate ring (18) is designed to taper towards the inner space (8).

6. A gas spring according to claim 1, wherein the supporting ring (13, 13') is of plastic material having good sliding properties towards metal.

7. A gas spring according to claim 1, wherein the supporting ring (13, 13') and the seal (15) are firmly connected with one another.

8. A gas spring according to claim 1, wherein the gas thrust force acting on said piston rod (23) is reduced as the cross-section of said rod at said seal becomes smaller.

9. A gas spring according to claim 1, wherein the thrust force on the piston rod (23) is reduced as the rod is moved to its pushed in position.

10. A gas spring with a tubular housing (1) closed at one end (2) and having an inner space (8) filled with compressed gas and a piston rod (4) brought out of another end (3) of the housing (1) which piston rod is provided at an end situated in the housing (1) with a piston (6) for lateral support relative to an inner wall (7) of the housing (1), which rod, at the other end of the housing (1) is guided in a guide bush (11, 11') and, in the direction of a central longitudinal axis (5), can be moved between a position substantially pushed into the housing (1), against which a seal (15) made of an elastic sealing material rests sealingly, wherein the piston rod (4) has a tapering (23) which, in the pushed-in position of the piston rod (4), cooperates with the seal (15), wherein the seal (15) is designed radially resilient and is provided with an axially acting radially resilient supporting ring, (13, 13') and wherein the supporting ring (13, 13') has an annular base element (14) on which webs (24, 24') are formed which extend substantially parallel with the axis (5) and which are elastically movable radially towards the axis (5).

11. A gas spring according to claim 10, wherein the seal (15) rests axially against the webs (24, 24').

12. A gas spring according to claim 10, wherein between adjacent webs (24) grooves (25) are formed which extend parallel with the axis (25) and through the annular base element (14).

13. A gas spring according to claim 10, wherein the seal (15) is impinged on its side facing the inner space (8) by the compressed gas, and on its side facing away from the inner space (8) by atmospheric pressure.

14. A gas spring according to claim 13, wherein the supporting ring (13, 13') is mounted on the side of the seal (15) facing away from the inner space (8).

15. A gas spring according to claim 10, wherein the seal (15) has an inner ring (17) resting against the piston rod (4) and a membrane-like intermediate ring (18) surrounding the inner ring (17).

16. A gas spring according to claim 15, wherein the intermediate ring (18) is designed to taper towards the inner space (8).

17. A gas spring according to claim 10, wherein the supporting ring (13, 13') is of plastic material having good sliding properties towards metal.

18. A gas spring according to claim 10, wherein the supporting ring (13, 13') and the seal (15) are firmly connected with one another.

19. A gas spring with a tubular housing (1) closed at one end (2) and having an inner space (8) filled with compressed gas and a piston rod (4) brought out of another end (3) of the housing (1) which piston rod is provided at an end situated in the housing (1) with a piston (6) for lateral support relative to an inner wall (7) of the housing (1), which rod, at the other end of the housing (1) is guided in a guide bush (11') and, in the direction of a central longitudinal axis (5), can be moved between a position substantially pushed into the housing (1) and a position substantially extended out of the housing (1), against which a seal (15) made of an elastic sealing material rests sealingly, wherein the piston rod (4) has a tapering (23) which, in the pushed-in position of the piston rod (4), cooperates with the seal (15), wherein the seal (15) is designed radially resilient and is provided with an axially acting radially resilient supporting ring (13'), and wherein the supporting ring (13') is formed integral with the guide bush (11') and wherein webs (24') are formed on the guide bush (11') extending substantially parallel with the axis (5), elastically movable radially to the axis (5) between which webs grooves (25') are formed extending parallel with the axis (5).

20. A gas spring according to claim 19, wherein the grooves (25') are formed only between the webs (24').

21. A gas spring according to claim 19, wherein the seal (15) is impinged on its side facing the inner space (8) by the compressed gas, and on its side facing away from the inner space (8) by atmospheric pressure.

22. A gas spring according to claim 21, wherein the supporting ring (13') is mounted on the side of the seal (15) facing away from the inner space (8).

23. A gas spring according to claim 19, wherein the seal (15) has an inner ring (17) resting against the piston rod (4) and a membrane-like intermediate ring (18) surrounding the inner ring (17).

24. A gas spring according to claim 23, wherein the intermediate ring (18) is designed to taper towards the inner space (8).

25. A gas spring according to claim 19, wherein the supporting ring (13') is of plastic material having good sliding properties towards metal.

26. A gas spring according to claim 19, wherein the supporting ring (13') and the seal (15) are firmly connected with one another.

27. A gas spring with a tubular housing (1) closed at one end (2) and having an inner space (8) filled with compressed gas and a piston rod (4) brought out of another end (3) of the housing (1) which piston rod is provided at an end situated in the housing (1) with a piston (6) for lateral support relative to an inner wall (7) of the housing (1), which piston rod (4), at the other end of the housing (1) is guided in a guide bush (11, 11') and, in the direction of a central longitudinal axis (5), can be moved between a position substantially pushed into the housing (1) and a position substantially extended out of the housing (1), against which a seal (15) made of an elastic sealing material rests sealingly, wherein the piston rod (4) has a tapering (23) which, in the pushed-in position of the piston rod (4), cooperates with the seal (15) and, wherein said seal (15) prevents gas passage between said seal (15) and said piston rod (4) at all positions of said piston rod (4).

* * * * *